United States Patent
Buck et al.

(10) Patent No.: US 10,372,851 B2
(45) Date of Patent: Aug. 6, 2019

(54) INDEPENDENTLY PROJECTING A CANONICAL CLOCK

(71) Applicant: International Business Machines Corporation, Armonk, NY (US)

(72) Inventors: Nathan Buck, Underhill, VT (US); Sean M. Carey, Hyde Park, NY (US); Peter C. Elmendorf, Poughkeepsie, NY (US); Eric A. Foreman, Fairfax, VT (US); Jeffrey G. Hemmett, St. George, VT (US); Lyle Jackson, Poughkeepsie, NY (US); Kerim Kalafala, Rhinebeck, NY (US); Stephen G. Shuma, Underhill, VT (US); Michael H. Wood, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 15/592,351

(22) Filed: May 11, 2017

(65) Prior Publication Data
US 2018/0330032 A1   Nov. 15, 2018

(51) Int. Cl.
*G06F 17/50* (2006.01)

(52) U.S. Cl.
CPC ...... *G06F 17/5031* (2013.01); *G06F 17/5036* (2013.01); *G06F 17/505* (2013.01);
(Continued)

(58) Field of Classification Search
CPC ............... G06F 17/505; G06F 2217/10; G06F 2217/62; G06F 17/50; G06F 17/5031; G06F 17/5036; G06F 17/5045; G06F 2217/84
See application file for complete search history.

(56) References Cited

U.S. PATENT DOCUMENTS 7,620,921 B2 * 11/2009 Foreman ............. G06F 17/5031
                                                            716/113
8,086,988 B2 * 12/2011 Buck ................... G06F 17/5045
                                                            716/108
(Continued)

OTHER PUBLICATIONS

Visweswariah et al.; "First-Order Incremental Block-Based Statistical Timing Analysis"; Year: 2006; IEEE Transactions on Computer-Aided Design of Integrated Circuits and Systems; vol. 25 , Issue: 10; pp. 2170-2180.*

(Continued)

*Primary Examiner* — Helen Rossoshek
(74) *Attorney, Agent, or Firm* — Steven Meyers; Otterstedt, Wallace & Kammer, LLP

(57) ABSTRACT

A design and timing model for at least one circuit path of at least a portion of an IC design is loaded into a computer. At least one canonical clock variable associated with the model is defined; it includes at least one source of variation. The computer is used to perform an SSTA of the at least one circuit path, based on the design and timing model and the at least one canonical clock variable, to obtain slack canonical data. A clock period is projected, based on the slack canonical data, such that a cycle time canonical is projected to a different space than a logic canonical. Results of the SSTA and the projected clock period are output to determine performance compliance. Efficient operation of the computer is enhanced by analyzing a slack vector in a single timing run, loaded once, and multithreading timing propagation.

17 Claims, 5 Drawing Sheets

(52) U.S. Cl.
CPC ...... *G06F 17/5045* (2013.01); *G06F 2217/10* (2013.01); *G06F 2217/12* (2013.01)

(56) References Cited

U.S. PATENT DOCUMENTS

| | | | |
|---|---|---|---|
| 8,122,409 B2 | 2/2012 | Lackey et al. | |
| 8,141,025 B2 | 3/2012 | Sinha et al. | |
| 8,560,989 B2 | 10/2013 | Buck et al. | |
| 8,656,207 B2* | 2/2014 | Buck | H03L 7/08 713/503 |
| 8,719,763 B1* | 5/2014 | Bickford | G01R 31/31718 716/113 |
| 8,732,642 B2 | 5/2014 | Visweswariah et al. | |
| 8,781,792 B2* | 7/2014 | Visweswariah | G06F 17/5045 702/117 |
| 9,495,497 B1 | 11/2016 | Buck et al. | |
| 9,552,447 B2* | 1/2017 | Bickford | G06F 17/5031 |
| 9,767,239 B1* | 9/2017 | Buck | G06F 17/5081 |
| 9,939,880 B1* | 4/2018 | Foreman | G06F 17/5031 |
| 10,013,516 B2* | 7/2018 | Foreman | G06F 17/5081 |
| 10,216,252 B2* | 2/2019 | Foreman | G06F 17/5031 |
| 10,222,850 B2* | 3/2019 | Foreman | G06F 17/5031 |
| 10,222,852 B2* | 3/2019 | Foreman | G06F 17/5031 |
| 2015/0242554 A1 | 7/2015 | Dreibelbis et al. | |
| 2015/0234969 A1* | 8/2015 | Bickford | G06F 17/5068 716/136 |
| 2016/0314229 A1 | 10/2016 | Bickford et al. | |
| 2017/0083661 A1* | 3/2017 | Bickford | G06F 17/5081 |
| 2018/0101211 A1* | 4/2018 | Foreman | G06F 17/5031 |
| 2018/0101212 A1* | 4/2018 | Foreman | G06F 17/5031 |
| 2018/0210533 A1* | 7/2018 | Foreman | G06F 17/5031 |
| 2018/0210534 A1* | 7/2018 | Foreman | G06F 17/5031 |

OTHER PUBLICATIONS

Chun-Yu Chuang et al.; "Accurate closed-form parameterized block-based statistical timing analysis applying skew-normal distribution"; Year: 2009; 2009 10th International Symposium on Quality Electronic Design; pp. 68-73.*

Zhang, L., Hu, Y. & Chen, C. C. (2005). Block Based Statistical Timing Analysis with Extended Canonical Timing Model. Design Automation Conference, IEEE, 2005. pp. 250-253.

John Darringer et al, EDA in IBM: Past, Present, and Future. IEEE Transactions on Computer Aided Design of Integrated Circuits and Systems, vol. 19, No. 12, Dec. 2000. pp. 1476-1497.

Liberty Timing File (LIB). University of Maryland, Baltimore County, Advanced VLSI Design, CMPE 641, Lecture Notes . Downloaded Apr. 13, 2017. pp. 1-14.

Tony Drumm, The Quest for Synthesis and Layout Timing Closure. DAC 2000—The Quest—A.D. Drumm, Jun. 9, 2000, pp. 1-40.

Fred Schenkelberg, Root Sum Squared Tolerance Analysis Method. Downloaded from https://accendoreliability.com/2015/01/09/rootsumsquaredtoleranceanalysismethod/ on Apr. 13, 2017. pp. 1-8.

Lou Scheffer, Part II: Timing Closure Today. ASP-DAC 2001. Asia and South Pacific Design Automation Conference 2001 pp. 1-91.

* cited by examiner

INDEPENDENTLY PROJECTING A CANONICAL CLOCK

BACKGROUND

The present invention relates to the design of integrated circuits (ICs), and more specifically, to statistical timing analysis of such circuits.

Generally, ICs have data signals and a clock; the data signal needs to reach a certain node at the correct time vis-a-vis the time when the corresponding clock cycles the device at that node. If the data signal does not arrive in time, the clock is too fast, or alternatively, the data signal is taking too long to propagate (path is too slow). Classically, this problem was dealt with by looking at a worst case or process corner scenario wherein the logic gates have the worst possible combination of delays, and ensuring functioning under such conditions.

As ICs move to smaller-scale technology, this classic approach has proven to be excessively pessimistic. Accordingly, statistical techniques are now being used. In such techniques, delay is treated as a random variable and variations, such as process variations, are treated as following a Gaussian error curve. In this statistical approach, it can be decided, for example, what percentage yield is desirable for a given chip design.

SUMMARY

Principles of the invention provide techniques for independently projecting a canonical clock. In one aspect, an exemplary method includes the step of loading a design and timing model for at least one circuit path of at least a portion of an integrated circuit design into a computing device; defining at least one canonical clock variable associated with the design and timing model, wherein the at least one canonical clock variable includes at least one source of variation; using the computing device to perform a statistical static timing analysis (SSTA) of the at least one circuit path, based on the design and timing model and the at least one canonical clock variable, to obtain slack canonical data; projecting a clock period, based on the slack canonical data, such that a cycle time canonical is projected to a different space than a logic canonical; and outputting results of the statistical static timing analysis (SSTA) and the projected clock period in a form for determining performance compliance of the at least one circuit path of the at least a portion of the integrated circuit design.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

ability to carry out statistical timing analysis with the clock in a different subspace than the logic, without extra clock timing constraints;

ability to model second order behavior of canonical clock;

ability to easily see clock period changing in unlimited voltage/period scenarios;

extendable to n number of sources of variation; and enhanced computational speed via scaling of threads.

These and other features and advantages of the present invention will become apparent from the following detailed description of illustrative embodiments thereof, which is to be read in connection with the accompanying drawings.

DETAILED DESCRIPTION

Figure 1:
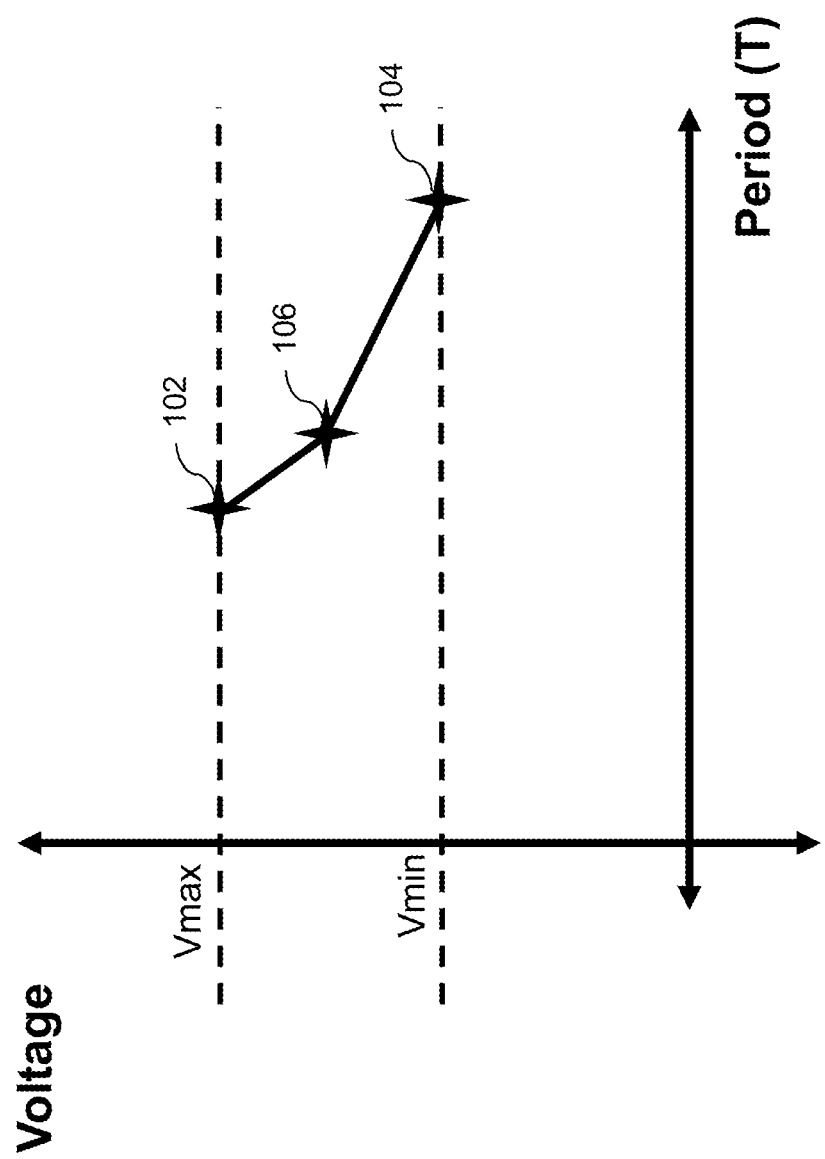
FIG. 1 shows an exemplary voltage-frequency space, advantageously amenable to analysis using aspects of the invention.

As noted, generally, ICs have data signals and a clock; the data signal needs to reach a certain node at the correct time vis-a-vis the time when the corresponding clock cycles the device at that node. If the data signal does not arrive in time, the clock is too fast, or alternatively, the data signal is taking too long to propagate (path is too slow). Classically, this problem was dealt with by looking at a worst case or process corner scenario wherein the logic gates have the worst possible combination of delays, and ensuring functioning under such conditions.

As ICs move to smaller-scale technology, this classic approach has proven to be excessively pessimistic. Accordingly, statistical techniques are now being used. In such techniques, delay is treated as a random variable and variations, such as process variations, are treated as following a Gaussian error curve. In this statistical approach, it can be decided, for example, what percentage yield is desirable for a given chip design.

A canonical clock has been implemented in a statistical timing engine. One or more embodiments provide new techniques for using a canonical clock in a number of different applications. Static timing analysis models how signals propagate and arrive at, e.g., a flip-flop, and ensures that when data arrives and is latched in at a capture latch, the data does not arrive too early or too late. Over-margining/worst-casing (design for the "corner case") is expensive and requires extra buffering to add delay, which in turn increases the circuit area and power consumption. Furthermore, as the delay of a data path gets longer, it becomes difficult for the clock period to maintain its performance. For example, adding more buffers to a data path to prevent early mode failure may result in adding so many that a setup (late mode) test now cannot be passed, without degrading the clock. Both aspects are undesirable.

A statistical timing engine permits, rather than propagating a single value, propagating a distribution of values with sources of variation that can be statistically combined (e.g. via RSS (root sum squares)) along a path. Use of RSS along a path, especially in the case of a long path, reduces unwarranted pessimism. At the end of a path where there is timing slack, RSS can be carried out across the statistical parameter set to reduce the overall variance that impacts the slack. Non-statistical sources of variation (like voltage) can be projected to their worst corner case (for example high or low VDD).

To enable the aforementioned functionality, one or more embodiments employ a statistical engine. Such engine allows for the creation of a parameter which in turn provides the ability to vary across a range. The statistical timing engine can handle both parameters that are statistical in nature and parameters that are not statistical in nature.

Parameters that are NOT statistical in nature include, e.g., voltage and temperature (corner-based variables). Nevertheless, it is possible to use the statistical engine as an efficient method for accounting for their variability on the design. Note that delay with respect to voltage typically does not follow a Gaussian distribution and a random variable typically is not used to represent voltage. Rather, voltage is not "RSS-ed" with other, random variables. Voltage can be referred to as a corner variable. That is, the IC chip will be able run at either high voltage or low voltage and perform anywhere in between, assuming a monotonic delay with respect to the voltage limits. However, in one or more embodiments, instead of having two timing runs—one run to fix the high voltage and one run to fix the low voltage, a single run can be undertaken using a voltage parameter in the statistical engine. In this aspect, the engine does not RSS the voltage parameter; simply analyzes at the worst corners—high voltage and low voltage. Thus, the efficiency of a statistical engine (only needing a single timing run) can be obtained but with the ability to handle corner-based variables.

Parameters that ARE statistical in nature include, e.g., silicon chip-to-chip variation, silicon and metal within chip on-chip variation (OCV) process variations.

Thus, in one or more embodiments, the statistical engine creates parameters which can be both corner-based (non-statistical) and statistical. Sensitivity is then computed for those parameters. Consider, for example, an inverter or buffer circuit. For the delay arc, going from input to output, consider both the delay at high voltage and the delay at low voltage. The difference between the two is the voltage delay difference across the voltage range. This difference can be divided by the number of standard deviations (sigma or $\sigma$). A sigma step represents a division point across the distribution of voltage. For example, "high" voltage can be taken as +3 sigma and "low" voltage as −3 sigma. Voltage points in between will be steps of sigma values. This allows taking the voltage delay difference between high and low voltage and dividing it by the sigma range (in this non-limiting example, +3−(−3)=6). The result is a time (typically expressed in picoseconds although this is not a limitation) per unit sigma value—i.e., a normalized sensitivity value. This can be computed for every source of variation, whether statistical or non-statistical.

In one or more embodiments, create a vector of normalized sensitivity and refer to that as a canonical model. The skilled artisan will appreciate that a canonical form is a known way to express the relationship between one or more variables and allows a parameter to be considered as a function of its variability. In this regard, the attention of the skilled artisan is drawn to U.S. Pat. No. 9,495,497 to Buck, et al., Dynamic voltage frequency scaling, and to U.S. Pat. No. 8,560,989 to Buck, et al., Statistical clock cycle computation, the complete disclosures of both of which are hereby expressly incorporated herein by reference in their entireties for all purposes.

Aspects of the mean value are also of interest. Consider a starting point of high voltage, and two parameters—voltage and process. For voltage, obtain delay at low voltage and compute sensitivity. The original starting point was the corner point of high voltage. Take the delay at the starting point and subtract off 3 sigma units of voltage sensitivity to obtain a mean value at the zero sigma point. Now consider the second parameter, process. Suppose the starting point was high voltage and fast process. Now compute the delay at slow process, compute sensitivity. Then, take the mean that was calculated after voltage and compute a new mean, after process, which takes the mean that was calculated after voltage and shifts by 3 times the sensitivity value of process to obtain the zero sigma point. Thus we have achieved an iterative process of computing a zero sigma point across all sources of variation.

It will thus be appreciated that the canonical model/vector of sensitivities has both: (i) a mean value and (ii) sensitivity to the sources of variation. This mean-shifting in essence permits taking the mean value and adding any appropriate number of sigmas, times the sensitivity of the parameters in the canonical model or vector, and combining them all together, to obtain the delay at any desired location in the process-voltage parameter space. Thus, the statistical engine computes the canonical model for a delay resulting in a vector value that can propagate along a path. When reaching the next logic gate along the path (e.g. going from an inverter to an OR gate or to another inverter), the canonical model for the next gate is computed. Like terms of the vectors are added—the method undertaken by the engine can be thought of as matrix addition. When the end point is reached, or considering, for example, a data path up to a flip-flop, where the data point is latched into a flip-flop, the method undertaken by the engine yields an arrival time which is the accumulation of all the delays—i.e., a vector in that form.

Consider, for example, a setup test, taking the earliest clock arrival time and subtracting the latest data arrival time in their canonical form (vectors, thus carrying out vector subtraction). What is left is the slack value, in canonical form. Then, for example, take that slack value and combine the components (e.g., adding+3 sigma of voltage to obtain high voltage) and RSS the silicon process variables with some other statistical parameters. Then take 3 sigma from the mean of the resultant RSS as well, thus obtaining the mean plus 3 sigma voltage minus 3 sigma of the resultant RSS value, for a final slack. Designers seek to achieve zero or higher positive slack; this tells the designer that across the variation space of interest, he or she has achieved the timing performance target.

This leads into a clock canonical model. By way of review, for static timing, frequency dependent tests include the clock period as part of the slack equation. For purposes of clarifying vector subtraction, the previously described setup test did not include cycle time; however, given the teachings herein, the skilled artisan will be able to account for cycle time as needed (refer e.g. to formulas below). Statistical timing can be enhanced with a canonical clock which has variability with any number of sources of variation defined in a statistical static timing run. For example, a canonical clock with voltage as a source of variation "says" at high voltage use a specified period and low voltage use a different period (in a non-limiting example, high voltage speeds up the silicon permitting use of a shorter period/faster clock; however, there might be interest in a slower clock at higher voltage in other instances—e.g., to save power). In statistical timing, the slack canonical can be projected to specific corner(s) or subspace, thus allowing the cycle time to change with the changing voltage. The canonical clock will project to the same subspace. Heretofore, if the clock needs to be at a different subspace than the logic (clock/data arrival time or AT), it has not been possible to do this without extra clock timing constraints. Consider, for example, if it was desired to see what the slack looks like when running the clock a little bit faster at a given voltage.

Thus, for static timing analysis, frequency dependent tests (e.g. setup test) include the clock period as part of the slack equation. Frequency dependent means that there is a cycle time included in the setup test. The setup test is typically the earliest arrival time of the clock plus the cycle time minus the latest arrival time of the data path. When launching data from a flip-flop, and seeking to capture the data in a flip-flop downstream, there is a cycle that is occurring, e.g. one clock cycle. It is desired to ensure that the latest possibly delayed data will arrive at the flip-flop such that it is captured by the capturing clock. If the delay is excessive, the wrong data will be captured. There is a window of time when the data arrives and is waiting for the latch to trigger and latch in the data. If the data arrives too late, the clock must be slowed down to provide a larger cycle time in order to latch in the data; i.e., the clock must be slowed down to match the lateness of the data.

Consider the concept of treating the cycle time in canonical form. This means that the cycle time can change with respect to sources of variation. Many integrated circuit chips change their clock period as a function of the voltage. Many integrated circuit chips (e.g. microprocessors, cell phones, portable devices, large and small systems, and the like) are constantly turning clocks on or off, speeding them up or slowing them down, based on the load and the activity level. For example, if the chip is not busy, an entire domain may be shut off, or the clock may be slowed down, so as to use less power. Integrated circuit chips can have different clock speeds at different voltages. For example, one reason is that voltage changes the silicon delays. A high voltage will speed up the switching speed of the transistors. A low voltage will slow the transistors. However, the clock cycle is independent of transistor speed; yet, it is used to counter the impact of circuit delay due to voltage. It will thus be appreciated that, since the transistors are speeding up when the voltage is increased, if desired, one could speed the clock up. Currently, designers may run hundreds of different timing runs to cover different process conditions as well as different cycle timing conditions. For example, they may run 2-3 different clock frequencies at a number of different voltages. Typically, clock cycles are fixed values; e.g., running at 1 GHz, 1.5 GHz, and so on. Those cycles are typically timing constraints that are applied in the timing engine by the designer—a fixed, single value. For example, a timing run may be carried out at three different voltages, with three different clock periods for each voltage. In each case, a check is made as to whether the targets are met (to determine, whether there is positive slack). If so, the designer can be confident that the chip will work in the field under those conditions.

One or more embodiments enhance this prior technique to a higher level of accuracy by creating a canonical clock—that is to say, making a clock period that changes with respect to voltage. For example, at high voltage, it can have a faster cycle time, while at low voltage, it has a slower cycle time, and anywhere in between it changes accordingly. One or more embodiments have a mean for the clock cycle and a sensitivity to voltage for the clock cycle. When it is desired to know what the cycle time is at a particular voltage point, add the mean plus some percentage of the sensitivity, or in other words, so many sigmas of sensitivity, to obtain the clock cycle. Embodiments permit including this aspect in, e.g., computation of setup tests, permitting cycle time/ frequency dependent tests.

For static timing, frequency-dependent tests include a clock period as part of the slack equation. In one or more embodiments, a statistical timing engine is enhanced with a canonical clock, with an arbitrary number of sources of variation. In a non-limiting example, consider the case where only the voltage parameter is varied. As discussed elsewhere, for example, a canonical clock with voltage as a source of variation "says" at high voltage use a one specified period and low voltage use different specified period. The designer can determine desired performance. In statistical timing, the slack canonical can be projected (combine the mean value plus all the sensitivities) to specific corner(s) or subspace. When combined into a corner, the canonical clock will project within the same space because it is a function of the same sources of variation.

However, suppose it is stated that it is desired to consider high VDD. There will be a slack which is a mean value plus a sensitivity to each source of variation. Combine those and obtain the slack at high voltage. Consider that the clock can be independent as a function of application as opposed to the actual logic, which depends on voltage as a function of silicon physics (transistor switching speed at different voltage thresholds). In one or more embodiments, it is possible to treat the clock differently than the logic. For example, suppose it is desired to see what the slack looks like when we the clock is run a little bit faster at a given voltage. That is, suppose you have projected to a high voltage and have undertaken timing analysis there, but now desire to see what happens if the clock cycle is a little bit faster. It is not desired to project to a higher voltage; in this example it is desired to keep the same voltage so that transistor silicon delays do not change. The end result will highlight if timing slack can be maintained within a required threshold at this new clock speed. One or more embodiments provide this capability. Referring to FIG. 1, which is an example of the relationship between voltage and clock period, the x-axis is clock period. When moving to the right, the clock slows down (lower frequency) and the period goes up; when moving to the left, the clock speeds up (higher frequency) as the period goes down. The y-axis is voltage. Thus, FIG. 1 is an exemplary voltage-clock period curve demonstrating performance of one non-limiting exemplary design. Point 102 is fast clock, high voltage; point 104 is slow clock low voltage. If points 102 and 104 are used to define a canonical clock, it might be desirable to know the clock period at some voltage between VMIN and VMAX. One might draw a straight line between the two points 102 and 104 but this would yield a clock period slower than where it is really possible to run (i.e. the actual point 106). One or more embodiments model how the clock period changes differently than the silicon—non-linear monotonic behavior happens with the clock period but it does not typically happen with silicon. The silicon is essentially a straight line. For example, if FIG. 1 was changed to plot silicon-based delay in the x-axis, the delay would be a straight line; however, a straight line is not necessarily obtained with a clock as seen in FIG. 1. Thus, it will be appreciated that the clock period may not follow a linear path across voltage and/or that clock period can be separated from logic voltage/delay response.

One or more embodiments permit treating Gaussian (e.g. process) and non-Gaussian (e.g. voltage) aspects separately. This is referred to herein as "mixed projection." The following equation is an industry standard for setup test for slack:

$$\text{Slack} = AT_{clk} + T - AT_{Data} - G(\text{SetupMargin}) \quad (1)$$

In the above, $AT_{clk}$=clock arrival time. Consider a capturing flip-flop, wherein a piece of data has been launched, gone through a clock cycle, and is about to be captured into a flip-flop. This happens over a cycle time, where T=cycle time. The clock arrival time plus cycle time is given by $AT_{clk}+T$ Now, subtract the data arrival time $AT_{data}$. This yields the time for the data arriving at the flip-flop. Then, subtract Setup Margin or guard time, G. In this regard, typically, when flip-flops are characterized, there is a setup margin that is applied to the circuit and that is part of the circuit library (the delay library). There will be a particular value of the guard time for a particular voltage-temperature-process condition. The terms "setup margin" and "hold margin" are used interchangeably in industry with "guard time."

It will be seen that one way to achieve positive slack is to slow down the clock, thus increasing the cycle time (T grows larger to account for a later data clock). This is undesirable.

Note that the slack can be placed in canonical form, as follows:

$$\text{Slack} = a_0 + \sum_{i=1}^{n} a_i \Delta X_i + r\Delta R \quad (2)$$

In the above, $a_0$ is a mean value; $a_i \Delta X_i$ is a sensitivity per source of variation; and $r\Delta R$ is a random variation that can be treated differently, such that it can be "RSS-ed" along a path. One or more embodiments include the latter as a separate term.

Equation (2) yields the slack/sensitivity value/time value, typically in time (in a non-limiting example, time may be expressed in picoseconds). Suppose, in the equation (2), there is only one parameter of interest; namely, the voltage $V_{dd}$. Equation (2) then reduces to a mean value plus a voltage sensitivity $V_{dd}$, as follows:

$$\text{Slack} = a_0 + a_{Vdd} \Delta Vdd \quad (3)$$

Note that the $V_{dd}$ value here is a normalized source of variation expressed in time per unit sigma rather than volts. This is because delays/timing quantities are a function of the voltage. If it is desired to analyze for high $V_{dd}$, take the three sigma value as follows:

$$\text{Slack} = a_0 + 3 * a_{Vdd} \Delta Vdd \quad (4)$$

The right-hand side of equation (4) includes the mean plus three times the voltage sensitivity. Suppose, for illustrative purposes, that $a_0$ is 15 picoseconds, and that the $V_{dd}$ (sensitivity) is −2 picoseconds/sigma (i.e., per sigma). Then, at high voltage, the projected value of Slack=15+3(−2)=15−6=9 picoseconds. Now, take the canonical form of the example (one source of variation) and apply it to the test slack equation above with the arrival time, and break out all of the components, in canonical form. Then the arrival time clock in equation (1) is given by (arrival time plus 3 sigma $V_{dd}$):

$$\left(a_{AT_{clk}} + 3 * a_{Vdd_{AT_{clk}}} \Delta Vdd_{AT_{clk}}\right) \quad (5)$$

The cycle time is given by the mean cycle, in this non-limiting example with T projected to 4 sigma:

$$(a_T + 4 * a_{Vdd_T} \Delta Vdd_T) \quad (6)$$

The data arrival time is given by the mean value plus three sigma voltage sensitivity:

$$\left(a_{AT_{Data}} + 3 * a_{Vdd_{AT_{Data}}} \Delta Vdd_{AT_{Data}}\right) \quad (7)$$

Finally, the guard time includes its mean value plus its voltage sensitivity:

$$(a_G + 3 * a_{Vdd_G} \Delta Vdd_G) \quad (8)$$

The final form is then:

$$\text{Slack} = \left(a_{AT_{clk}} + 3 * a_{Vdd_{AT_{clk}}} \Delta Vdd_{AT_{clk}}\right) + (a_T + 4 * a_{Vdd_T} \Delta Vdd_T) - \left(a_{AT_{Data}} + 3 * a_{Vdd_{AT_{Data}}} \Delta Vdd_{AT_{Data}}\right) - (a_G + 3 * a_{Vdd_G} \Delta Vdd_G) \quad (9)$$

A prior art canonical clock will treat everything projected to the same sigma value. One or more embodiments, in contrast, permit taking, for example, the cycle time projected value (second term) projected to 4 sigma while taking the rest of the logic at 3 sigma. This permits, numerically, looking at a longer cycle time and thus a slower clock. Equation (9) is pertinent in one or more embodiments. Equation (9) thus provides the canonical form of every term in the slack equation; the cycle time canonical can be projected to a different space than that of the data and clock logic.

Note, however, that equation (9) is not a generalized equation, but rather, is a specific example, where it is chosen to use 4 sigma on the period and 3 sigma on the remainder of the terms. More generally, one could use different sigma values for any of the terms. In the general case, the cycle time can be projected to any desired sigma and the logic can be projected to any desired sigma. In addition, the logic can have additional sources of variation besides $V_{dd}$; for example, the logic could have additional sources of variation such as process, temperature, and/or other parameters; and the cycle time might only have variation with $V_{dd}$. Even further, one could have logic vary with just $V_{dd}$ and clock cycle time could vary with $V_{dd}$ and temperature. In general, one can have any number of sources of variation for the clock cycle, any number of sources of variation for the logic, and any combination of sigma projections for the logic and the clock cycle.

Equation (1) is a standard equation for setup slack, while equation (2) is a generalized form for a canonical model. For example, for a clock canonical:

$$\text{Slack} = t_0 + \sum_{i=1}^{n} t_i \Delta X_i + r\Delta R \qquad (10)$$

It is possible to have a separate canonical form for the clock cycle with a different set of variables than that of the timing quantity. This permits generalization. Note that while equations (1) and (2) are general, equations (3), (4), and (9) are a non-limiting specific example.

One or more embodiments make use of the fact that the cycle time is independent of the logic. Furthermore, the statistical engine provides the capability of including parameters that behave statistically and parameters that behave non-statistically in a corner-based fashion, such as voltage or temperature (e.g., environmental variables). Thus, one or more embodiments permit handling both Gaussian and non-Gaussian parameters.

Heretofore, if it was desired to analyze 3 different voltages at 3 different cycle times, 9 different timing runs would have to be made. There would be 9 sets of timing reports and it would be necessary to optimize the design across the nine different reports. Further, significant machine resources would be required to undertake all 9 runs. In contrast, in one or more embodiments, using a statistical engine, run a single timing run and utilize a vector for the slack and simply combine it 9 different ways. Determine which one is worst and only provide that in the report, for example—that is then the limiting slack across the parameter space of interest. Advantageously, this approach takes less time, less computing resources, and is easier for the designer than prior art approaches.

Statistical engines are normally implemented at the gate level rather than the transistor level. The timing and power parameters are obtained by simulating the cells under a variety of conditions and the data is represented in a delay library (for example, the .lib format.) The industry standard liberty delay model or liberty timing file. The .lib file is an ASCII representation of the timing and power parameters associated with any cell in a particular semiconductor technology. The .lib file contains timing models and data to calculate I/O delay paths, timing check values, and other silicon based timing quantities. Input/output (I/O) path delays and timing check values are computed on a per-instance basis.

For an inverter, or a buffer, for example, the liberty delay model includes tables of delays with an input transition time (called a slew) and an output load. For a given input transition—output load of an inverter, it is possible to access the table in the delay model (ASCII file) with slew in the x-axis and load in the y-axis, with a filled-in matrix, and find the delay at that value. Libraries are typically characterized across some slew-load ranges, for different process-voltage-temperature conditions.

Suppose a designer develops a design and engages with a foundry to build the design. The foundry will typically deliver the delay models and information on the types of circuits used for the delay models. Then, the designer can utilize a commercial timing tool such as are available from Cadence Design Systems, Inc., San Jose, Calif., USA or Synopsys, Inc., Mountain View, Calif., USA, load in the delay models, and perform static timing on, e.g., a Verilog or VHDL netlist design and determine the slack. In one or more embodiments, obtain a plurality of liberty delay models; e.g., at high voltage and low voltage; at fast process and slow process; and load all of them into the timing engine at once and create a plurality of lookup tables. Then, when creating an abstract to gate level timing, if considering an inverter, the program will recognize that the element in question is, e.g., an inverter, that the delay at high voltage is needed, and that the lookup table at that PVT (process, voltage, temperature) condition should be accessed."

The program will compute the sensitivities on the fly and build the canonical model for the delay model. In one aspect, this is more computationally expensive than just looking at a single corner. However, it is possible to address this expense by being "clever." For example, if sensitivity is quite low for an inverter, one can choose not take a memory slot for the inverter. Furthermore in this regard, if the sensitivity is below some threshold, one can just have a pointer to null and not take up the memory slot. Thus, in one or more embodiments, a vector is being propagated but internally it may well be a sparse vector because some sensitivities are not very large. In another example, if a design has three different voltage rails but they track together, one may represent them internally as a single virtual voltage parameter, thus reducing the vector space from 3 terms down to a single term.

Furthermore, in another aspect, there are computational efficiencies as compared to the prior art. Consider the example involving nine different runs, wherein the design must be loaded 9 times with all libraries loaded 9 different ways. In contrast, in one or more embodiments of the invention, load once and multithread the timing propagation. A prior art approach might use nine parallel runs each with 2 threads, for a total of 18 CPUs on a machine; one or more embodiments of the invention might run a single statistical run and take 18 CPUs and apply them to the statistical propagation—this will typically be significantly faster than the prior art. If computing resources are fixed, one or more embodiments permit scaling the threads to speed up the computation.

Figure 2:
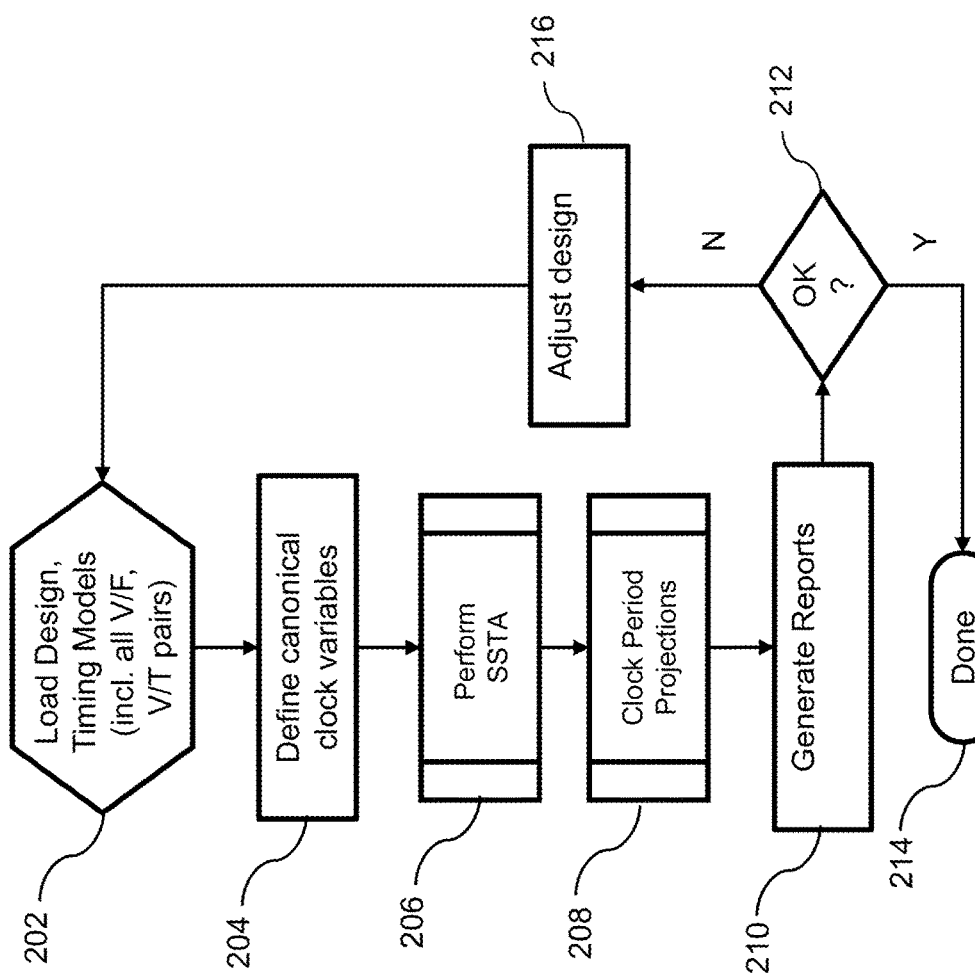
FIG. 2 is a flow chart of an exemplary method, according to an aspect of the invention.

FIG. 2 is a flow chart of an exemplary method. Step 202 includes loading the design and timing models (V/F voltage/frequency pairs or V/T voltage/period pairs). In a non-limiting example, the designer knows that his or her design will operate in some voltage ranges. He or she would like his or her design to perform at certain frequencies, at the given voltages. IC chips are typically tested and placed in different lots depending on what cycle times they can achieve. Slower chips may sell for a lower price than faster chips, for example. In step 204, define the canonical clock variables, i.e., canonical clock is a function of voltage, temperature, process, and the like. In one or more embodiments, logic delay canonical variables are also defined in this step. In step 206, perform the statistical static timing analysis (SSTA) by propagating the times, computing the delay vectors, and then determining the slack canonical (slack vectors).

In step 208, project the clock period to the desired configuration. Equation (9) is a non-limiting example. In step 208, it is possible to have any desired number of projections. In step 210, generate reports. Steps 208 and 210 are related in one or more embodiments. For example, a run can be left "up" in a "live" mode, and a designer could say, e.g., generate some reports at a certain clock frequency at a high voltage. Suppose this is done and a limiting path is identified. Suppose further that it is desired to run another report at a higher frequency, and now it is found that there are four limiting paths. The designer could optimize the limiting path(s) by rerouting logic or the like.

This aspect is suggested by decision block 212. If the reports indicate satisfactory performance, the current run(s) are complete, as per the "Y" branch leading to endpoint 214. On the other hand, if the reports do not indicate satisfactory performance, adjust the design, as per the "N" branch leading to step 216, and repeat the process with the adjusted design. This can be done in a live session or can be automated; e.g., with thousands of different combinations of changing wires, circuits, re-powering buffers, etc.

In one or more embodiments, the method of FIG. 2 is carried out and the design performance is verified prior to any actual manufacturing of silicon chips. A foundry will typically fabricate within tolerances that the foundry specified in the characterized libraries; e.g., a known delay at a certain voltage-temperature-process condition. As long as the correct delay models are provided by the foundry, one can be confident in obtaining correct results using the method of FIG. 2, and thus in obtaining working chips that meet required specifications. Of course, a foundry will typically undertake qualification and/or acceptance testing on actual physical chips.

Figure 3:
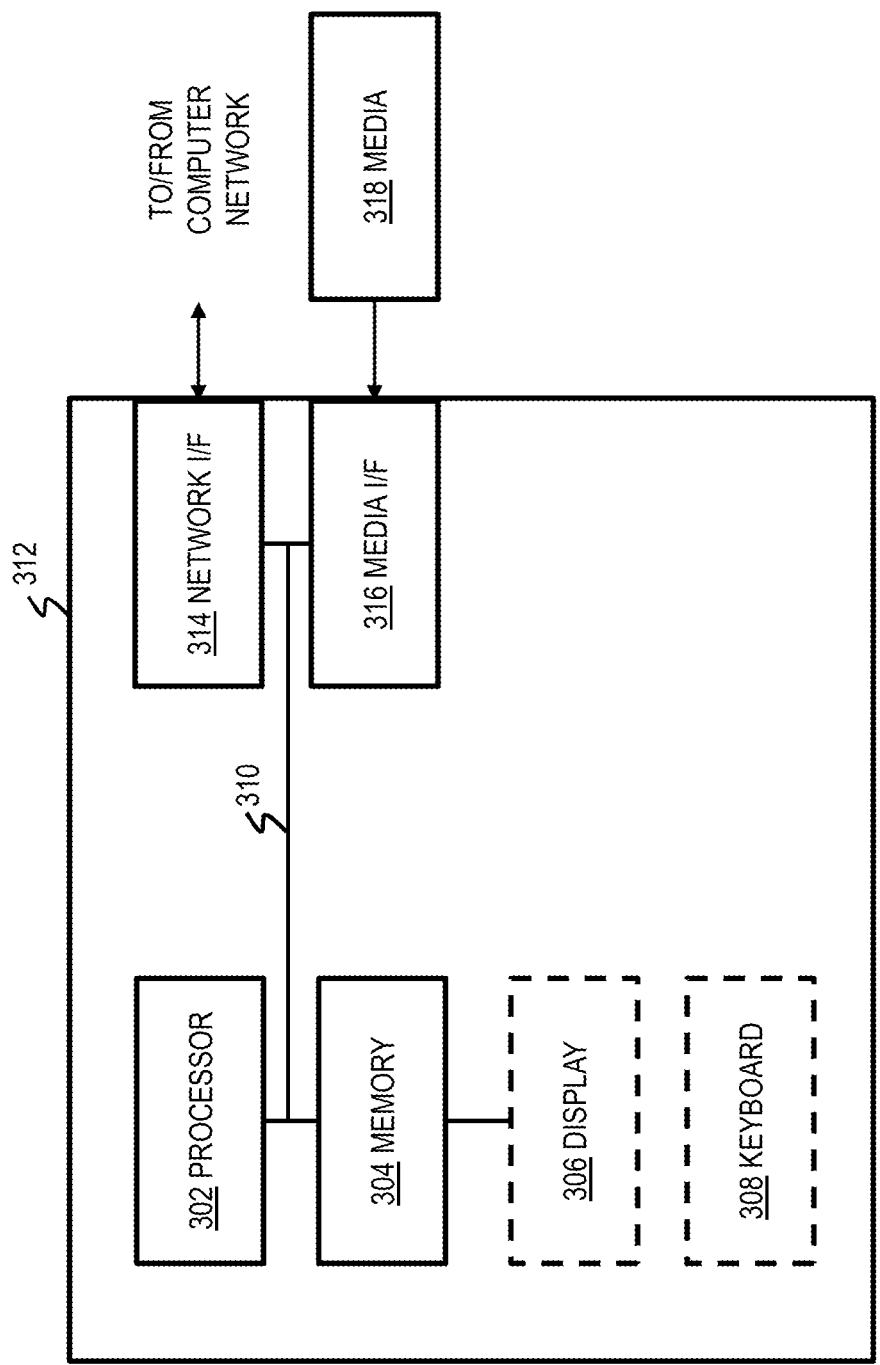
FIG. 3 depicts a computer system that may be useful in implementing one or more aspects and/or elements of the invention.

Given the discussion thus far, and referring, for example, to FIG. 2, it will be appreciated that an exemplary method, according to an aspect of the invention, includes the step 202 of loading a design and timing model for at least one circuit path of at least a portion of an integrated circuit design into a computing device (e.g. FIG. 3). A further step 204 includes defining at least one canonical clock variable associated with the design and timing model. The at least one canonical clock variable includes at least one source of variation. Note that some embodiments address a plurality of sources of variation which can, in general, be Gaussian and/or non-Gaussian. A further step 206 includes using the computing device (e.g. FIG. 3) to perform a statistical static timing analysis (SSTA) of the at least one circuit path, based on the design and timing model and the at least one canonical clock variable, to obtain slack canonical data.

Yet a further step 208 includes projecting a clock period, based on the slack canonical data, such that a cycle time canonical is projected to a different space than a logic canonical. An even further step 210 includes outputting results of the statistical static timing analysis (SSTA) and the projected clock period in a form for determining performance compliance of the at least one circuit path of the at least a portion of the integrated circuit design.

In one or more embodiments, the slack canonical data is characterized in a canonical slack equation including a plurality of terms. Equation (9) is a non-limiting example. Each of the terms in turn includes a mean value plus or minus a predetermined number of standard deviations times a corresponding sensitivity. At least a first one of the plurality of terms corresponds to a cycle time canonical form (e.g. expression (6)). At least a second one of the plurality of terms corresponds to a logic canonical form (e.g., expressions (5), (7), and/or (8)). Please note that "first" and "second" are used for convenience in the claims and do not necessarily correspond to the order of claims in Equation (9). The clock period is projected to the different space via the predetermined number of standard deviations for the cycle time canonical form being different than the logic canonical form. See, for example, in equation (9), four standard deviations for cycle time versus three for logic.

In some instances, the at least one canonical clock variable includes a plurality of sources of variation and the cycle time canonical form and the logic canonical form have different ones of the sources of variation. In general, one can have any number of sources of variation for the clock cycle, any number of sources of variation for the logic, and any combination of sigma projections for the logic and the clock cycle. In one or more embodiments the logic and clock cycle are projected to different sigma ranges, so as to do the "different projecting" of claim 1. One can potentially have multiple and/or different sources of variation for the clock cycle and the logic. Note also that the parameter set of the clock cycle should be a subset of the superset of parameters. For example, if the SSTA has a superset of parameters including, say, Param1, Param2, and Param3, then the canonical clock can have, for example: Param1, Param2, and Param3; Param1; Param2 and Param3; and so on. However, the canonical clock cannot have Param4 (i.e., a parameter not in the superset of SSTA parameters) because the statistical engine will not recognize Param4 and will be unable to quantify its effect on the timing. "Parameters" and "variables" are used interchangeably herein. Thus, in some embodiments, the at least one canonical clock variable which includes the at least one source of variation includes a subset of a total number of variables in the statistical static timing analysis (SSTA).

As discussed above, in some cases, the plurality of sources of variation include at least one Gaussian source of variation and at least one non-Gaussian source of variation. In a non-limiting example, the cycle time canonical depends on the at least one non-Gaussian source of variation and the logic canonical depends on the at least one Gaussian source of variation.

Referring to the non-limiting example of expressions (5)-(8) and equation (9), in some instances, the canonical slack includes a canonical clock arrival time term plus a canonical cycle time term less a canonical data arrival time term less a canonical guard time term; the canonical cycle time term includes the at least first one of the plurality of terms corresponding to the cycle time canonical form; and the canonical clock arrival term, the canonical guard time term, and the canonical data arrival time term include the at least second one of the plurality of terms corresponding to the logic canonical form. In this regard, note that the guard time term is part of the logic as it is characterized, for example, in the .lib delay models.

Referring still to FIG. 2, in some instances, further steps include step 212 NO branch, determining that the performance compliance of the at least one circuit path of the at least a portion of the integrated circuit design is unsatisfactory; and, responsive to the determining, adjusting the at least portion of the integrated circuit design and repeating the loading, defining, using, projecting, and outputting steps (step 216 with return to 202).

As discussed above, at least some embodiments further include enhancing computational efficiency by projecting the clock period, based on the slack canonical data, such that the cycle time canonical is projected to the different space than the logic canonical, without extra clock timing constraints.

As also discussed above, at least some embodiments further include enhancing computational efficiency by analyzing a slack vector in a single timing run, loaded once, and multithreading timing propagation.

In some instances, during the statistical static timing analysis (SSTA) of the at least one circuit path 206, the cycle time canonical changes due to downstream slack stealing where positive slack margin for downstream path can be "borrowed" or "stolen" for the upstream timing. That is to say, some embodiments add a component of clock period changes during timing propagation to solve slack stealing and create an additional cycle adjust to account for the "stolen" downstream margin. Such embodiments modify the SSTA step 206 as compared to prior art approaches to handle the slack stealing aspect. The skilled artisan will appreciate that "slack stealing" in and of itself is a known industry practice for carrying out timing analysis. By way of example, consider a flip-flop that feeds into a downstream flip-flop—over multiple cycles, one can borrow some of the slack from a downstream path, to help with timing of an upstream path. One or more embodiments thus include a canonical version of slack stealing.

Thus, one or more embodiments provide a unique sensitivity projection for the clock period vs. arrival times and/or project individual sensitivities of slack sensitivities to different parameter spaces.

One or more embodiments further include determining that the performance compliance of the at least one circuit path of the at least a portion of the integrated circuit design is satisfactory (whether on the first trial, or after the design has been adjusted based on a previous determination of unsatisfactory performance); and then instantiating the at least one circuit path of the at least a portion of the integrated circuit design into a design structure. Design structures are discussed below in the section entitled "EXEMPLARY DESIGN PROCESS USED IN SEMICONDUCTOR DESIGN, MANUFACTURE, AND/OR TEST." A further step then includes; and fabricating a physical integrated circuit including a physical manifestation of the at least one circuit path of the at least a portion of the integrated circuit design, based on the design structure.

Exemplary System and Article of Manufacture Details

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
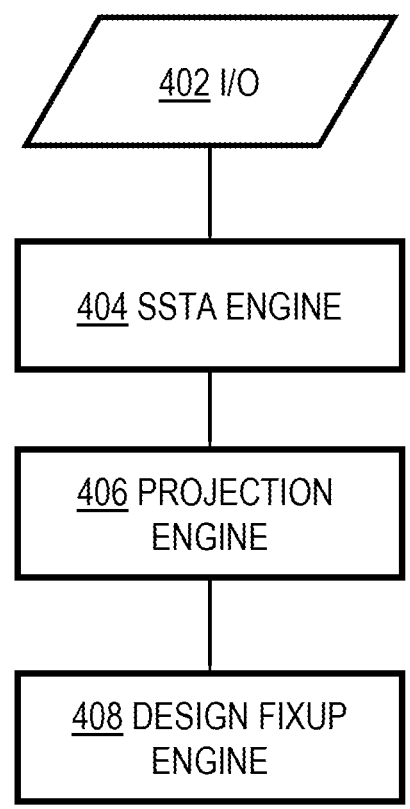
FIG. 4 is a software architecture diagram, according to an aspect of the invention.

It should be noted that any of the methods described herein can include an additional step of providing a system comprising distinct software modules embodied on a computer readable storage medium; the modules can include, for example, any or all of the elements depicted in the block diagrams and/or described herein. Referring to FIG. 4, by way of example and not limitation, the modules could include an input/output module 402; a projection engine module 406, a statistical static timing analysis (SSTA) engine module 404, and a design fixup engine module 408. The method steps can then be carried out using the distinct software modules and/or sub-modules of the system, as described above, executing on one or more hardware processors 302. For example, in one or more embodiments, the statistical static timing analysis (SSTA) is carried out by the statistical static timing analysis (SSTA) engine module executing on at least one hardware processor; the projecting of the clock period is carried out by the projection engine module executing on the at least one hardware processor; and the outputting of the results is carried out by the design fixup engine module executing on the at least one hardware processor. The I/O module 402 can implement input and output functions, as well as interfacing with the process 500 of FIG. 5. Further, a computer program product can include a computer-readable storage medium with code adapted to be implemented to carry out one or more method steps described herein, including the provision of the system with the distinct software modules. In one or more embodiments, the projection engine interfaces with the SSTA engine and the design fixup engine. The design fixup engine provides a mechanism to modify a design represented in a hardware description language, for example, or even to re-program FPGAs in a case when a design is implemented therein.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Exemplary Design Process Used in Semiconductor Design, Manufacture, and/or Test

Figure 5:
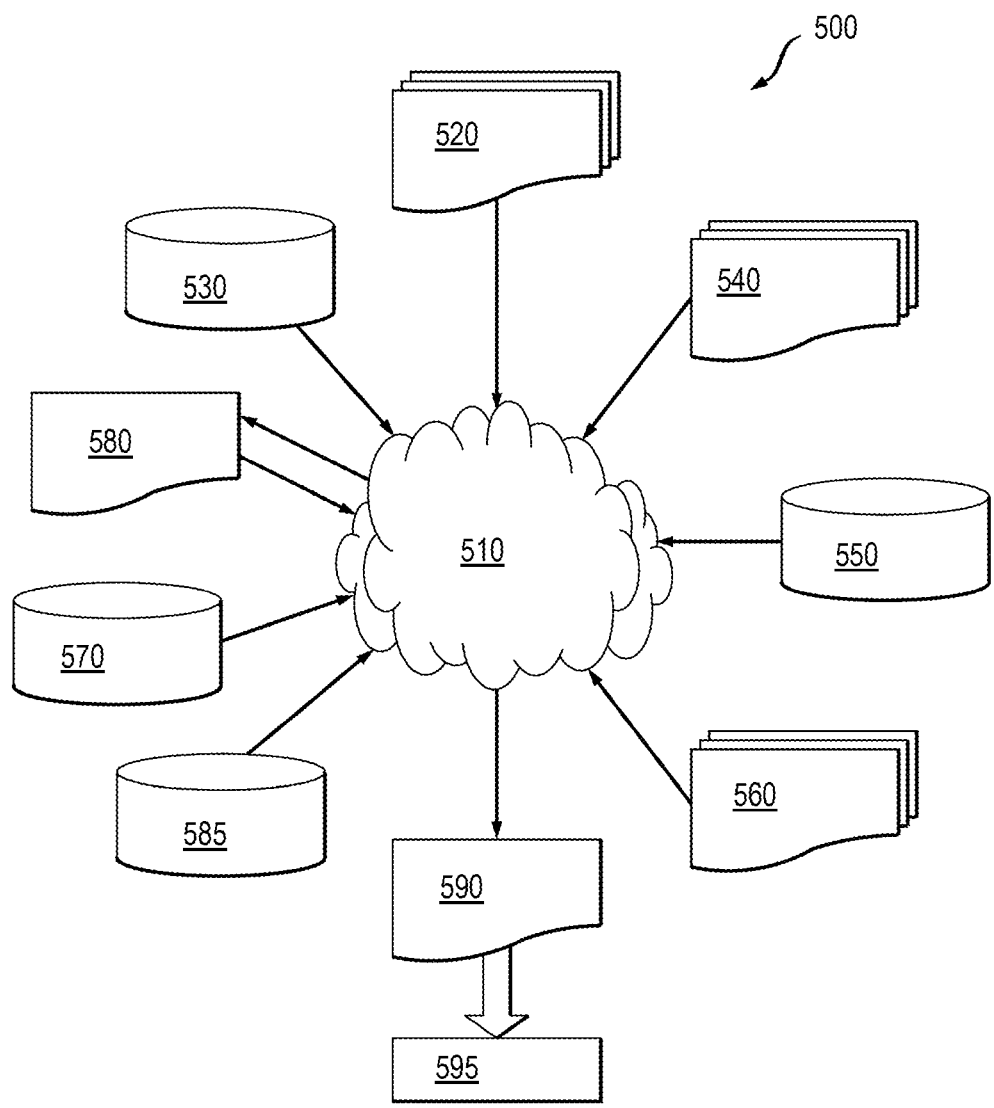
FIG. 5 is a flow diagram of a design process used in semiconductor design, manufacture, and/or test.

One or more embodiments integrate the SSTA techniques herein with semiconductor integrated circuit design simulation, test, layout, and/or manufacture. In this regard, FIG. 5 shows a block diagram of an exemplary design flow 500 used for example, in semiconductor IC logic design, simulation, test, layout, and manufacture. Design flow 500 includes processes, machines and/or mechanisms for processing design structures or devices to generate logically or otherwise functionally equivalent representations of design structures and/or devices, such as those that can be analyzed using SSTA or the like. The design structures processed and/or generated by design flow 500 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a gate array or storage medium or the like, design structure 520 may be accessed and processed by one or more hardware and/or software modules within design process 510 to simulate or otherwise functionally represent an electronic component, circuit, electronic or logic module, apparatus, device, or system. As such, design structure 520 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of components, circuits, devices, or logic structures to generate a Netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 510 may include hardware and software modules for processing a variety of input data structure types including Netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 540, characterization data 550, verification data 560, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc. Improved timing analysis can be performed as described herein.

Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 590 may comprise a compiled, executable HDL simulation model that functionally simulates the devices to be analyzed.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 590 may then proceed to a stage 595 where, for example, design structure 590: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   loading a design and timing model for at least one circuit path of at least a portion of an integrated circuit design into a computing device;
   defining at least one canonical clock variable associated with said design and timing model, wherein said at least one canonical clock variable includes at least one source of variation;
   using said computing device to perform a statistical static timing analysis (SSTA) of said at least one circuit path, based on said design and timing model and said at least one canonical clock variable, to obtain slack canonical data;
   projecting a clock period, based on said slack canonical data, such that a cycle time canonical is projected to a different space than a logic canonical;
   outputting results of said statistical static timing analysis (SSTA) and said projected clock period in a form for determining performance compliance of said at least one circuit path of said at least a portion of said integrated circuit design;
   determining that said performance compliance of said at least one circuit path of said at least a portion of said integrated circuit design is satisfactory;
   responsive to said determining, instantiating said at least one circuit path of said at least a portion of said integrated circuit design into a design structure; and
   fabricating a physical integrated circuit including a physical manifestation of said at least one circuit path of said at least a portion of said integrated circuit design, based on said design structure.

2. The method of claim 1, wherein:
   said slack canonical data is characterized in a canonical slack equation comprising a plurality of terms, each of said terms in turn comprising a mean value plus or minus a predetermined number of standard deviations times a corresponding sensitivity;
   at least a first one of said plurality of terms corresponds to a cycle time canonical form;
   at least a second one of said plurality of terms corresponds to a logic canonical form; and
   said clock period is projected to said different space via said predetermined number of standard deviations for said cycle time canonical form being different than said logic canonical form.

3. The method of claim 2, wherein said at least one canonical clock variable includes a plurality of sources of variation and wherein said cycle time canonical form and said logic canonical form have different ones of said sources of variation.

4. The method of claim 3, wherein said plurality of sources of variation comprise at least one Gaussian source of variation and at least one non-Gaussian source of variation.

5. The method of claim 2, wherein:
   said canonical slack comprises a canonical clock arrival time term plus a canonical cycle time term less a canonical data arrival time term less a canonical guard time term;
   said canonical cycle time term comprises said at least first one of said plurality of terms corresponding to said cycle time canonical form;
   said canonical clock arrival term, said canonical guard time term, and said canonical data arrival time term comprise said at least second one of said plurality of terms corresponding to said logic canonical form.

6. The method of claim 1, further comprising enhancing computational efficiency by projecting said clock period, based on said slack canonical data, such that said cycle time canonical is projected to said different space than said logic canonical, without extra clock timing constraints.

7. The method of claim 1, wherein said cycle time canonical depends on said at least one non-Gaussian source of variation and said logic canonical depends on said at least one Gaussian source of variation.

8. The method of claim 1, further comprising enhancing computational efficiency by analyzing a slack vector in a single timing run, loaded once, and multithreading timing propagation.

9. The method of claim 1, wherein said at least one canonical clock variable which includes said at least one source of variation comprises a subset of a total number of variables in said statistical static timing analysis (SSTA).

10. The method of claim 1, wherein, during said statistical static timing analysis (SSTA) of said at least one circuit path, said cycle time canonical changes due to downstream slack stealing.

11. The method of claim 1, further comprising providing a system, wherein the system comprises distinct software modules, each of the distinct software modules being embodied on a computer-readable storage medium, and wherein the distinct software modules comprise a projection engine module, a statistical static timing analysis (SSTA) engine module, and a design fixup engine module;
   wherein:
   said statistical static timing analysis (SSTA) is carried out by said statistical static timing analysis (SSTA) engine module executing on at least one hardware processor;

said projecting of said clock period is carried out by said projection engine module executing on said at least one hardware processor; and said outputting of said results is carried out by said design fixup engine module executing on said at least one hardware processor.

12. A non-transitory computer readable medium comprising computer executable instructions which when executed by a computer cause the computer to perform the method of:

loading a design and timing model for at least one circuit path of at least a portion of an integrated circuit design into a computing device;

defining at least one canonical clock variable associated with said design and timing model, wherein said at least one canonical clock variable includes at least one source of variation;

using said computing device to perform a statistical static timing analysis (SSTA) of said at least one circuit path, based on said design and timing model and said at least one canonical clock variable, to obtain slack canonical data;

projecting a clock period, based on said slack canonical data, such that a cycle time canonical is projected to a different space than a logic canonical;

outputting results of said statistical static timing analysis (SSTA) and said projected clock period in a form for determining performance compliance of said at least one circuit path of said at least a portion of said integrated circuit design;

determining that said performance compliance of said adjusted at least one circuit path of said at least a portion of said integrated circuit design is satisfactory;

responsive to said determining, instantiating said adjusted at least one circuit path of said at least a portion of said integrated circuit design into a design structure; and fabricating a physical integrated circuit including a physical manifestation of said adjusted at least one circuit path of said at least a portion of said integrated circuit design, based on said design structure.

13. The non-transitory computer readable medium of claim 12, wherein:

said slack canonical data is characterized in a canonical slack equation comprising a plurality of terms, each of said terms in turn comprising a mean value plus or minus a predetermined number of standard deviations times a corresponding sensitivity;

at least a first one of said plurality of terms corresponds to a cycle time canonical form;

at least a second one of said plurality of terms corresponds to a logic canonical form; and said clock period is projected to said different space via said predetermined number of standard deviations for said cycle time canonical form being different than said logic canonical form.

14. The non-transitory computer readable medium of claim 13, wherein said at least one canonical clock variable includes a plurality of sources of variation and wherein said cycle time canonical form and said logic canonical form have different ones of said sources of variation.

15. The non-transitory computer readable medium of claim 14, wherein said plurality of sources of variation comprise at least one Gaussian source of variation and at least one non-Gaussian source of variation.

16. An apparatus comprising:

a memory; and at least one processor, coupled to said memory, and operative to:

load a design and timing model for at least one circuit path of at least a portion of an integrated circuit design into said memory;

define at least one canonical clock variable associated with said design and timing model, wherein said at least one canonical clock variable includes at least one source of variation;

perform a statistical static timing analysis (SSTA) of said at least one circuit path, based on said design and timing model and said at least one canonical clock variable, to obtain slack canonical data;

project a clock period, based on said slack canonical data, such that a cycle time canonical is projected to a different space than a logic canonical;

output results of said statistical static timing analysis (SSTA) and said projected clock period in a form for determining performance compliance of said at least one circuit path of said at least a portion of said integrated circuit design;

determining that said performance compliance of said adjusted at least one circuit path of said at least a portion of said integrated circuit design is satisfactory;

responsive to said determining, instantiating said adjusted at least one circuit path of said at least a portion of said integrated circuit design into a design structure; and fabricating a physical integrated circuit including a physical manifestation of said adjusted at least one circuit path of said at least a portion of said integrated circuit design, based on said design structure.

17. The apparatus of claim 16, wherein:

said slack canonical data is characterized in a canonical slack equation comprising a plurality of terms, each of said terms in turn comprising a mean value plus or minus a predetermined number of standard deviations times a corresponding sensitivity;

at least a first one of said plurality of terms corresponds to a cycle time canonical form;

at least a second one of said plurality of terms corresponds to a logic canonical form; and said clock period is projected to said different space via said predetermined number of standard deviations for said cycle time canonical form being different than said logic canonical form.

* * * * *